United States Patent
Kolda

(10) Patent No.: US 7,055,725 B1
(45) Date of Patent: Jun. 6, 2006

(54) QUICK CONVERSION CONNECTION SYSTEM FOR A COMPONENT OF A VEHICLE-MOUNTED EQUIPMENT CARRIER

(75) Inventor: Clint D. Kolda, Cottage Grove, WI (US)

(73) Assignee: Saris Cycling Group, Inc., Madison, WI (US)

( * ) Notice: Subject to any disclaimer, the term of this patent is extended or adjusted under 35 U.S.C. 154(b) by 325 days.

(21) Appl. No.: 10/682,716

(22) Filed: Oct. 9, 2003

(51) Int. Cl.
*B60R 9/06* (2006.01)

(52) U.S. Cl. ............... 224/505; 224/497; 224/502; 224/506; 224/924; 411/412

(58) Field of Classification Search ............... 224/505, 224/506, 502, 503, 495, 496, 497, 521, 924; 411/388, 389, 412, 413
See application file for complete search history.

(56) References Cited

U.S. PATENT DOCUMENTS

| | | | | |
|---|---|---|---|---|
| 2,206,444 A * | 7/1940 | Beckwith | .................... | 224/506 |
| 4,790,702 A * | 12/1988 | Maganias | .................... | 411/412 |
| 4,877,364 A * | 10/1989 | Sorrentino | .................... | 411/337 |
| 5,518,156 A * | 5/1996 | Lehman | .................... | 224/281 |
| 6,345,748 B1 * | 2/2002 | Chimenti et al. | .................... | 224/324 |
| 6,382,654 B1 * | 5/2002 | Mahncke | .................... | 280/491.1 |
| 6,390,344 B1 * | 5/2002 | Edgerly | .................... | 224/531 |
| 6,502,729 B1 * | 1/2003 | Ferman | .................... | 224/497 |
| 6,547,116 B1 * | 4/2003 | Anderson et al. | .................... | 224/536 |
| 6,644,525 B1 * | 11/2003 | Allen et al. | .................... | 224/497 |
| 6,745,926 B1 * | 6/2004 | Chimenti | .................... | 224/509 |

\* cited by examiner

*Primary Examiner*—Nathan J. Newhouse
*Assistant Examiner*—Justin M. Larson
(74) *Attorney, Agent, or Firm*—Boyle, Fredrickson, Newholm, Stein & Gratz, S.C.

(57) ABSTRACT

A vehicle-mounted equipment carrier includes a base having a support member that is movable between an operative position and an inoperative position. An engagement member maintains the position of the support member, and is movable between an engaged position and a release position. The engagement member is movable between the engaged position and an intermediate position by a threaded connection with the base, is movable between the intermediate position and the release position by a sliding connection with the base. The shaft includes a threaded section that engages a threaded opening in the base, for providing movement of the engagement member between the engaged position and the intermediate position upon rotation of the engagement member, and an unthreaded section that moves the shaft axially within the opening for moving the engagement member between the intermediate position and the release position.

21 Claims, 6 Drawing Sheets

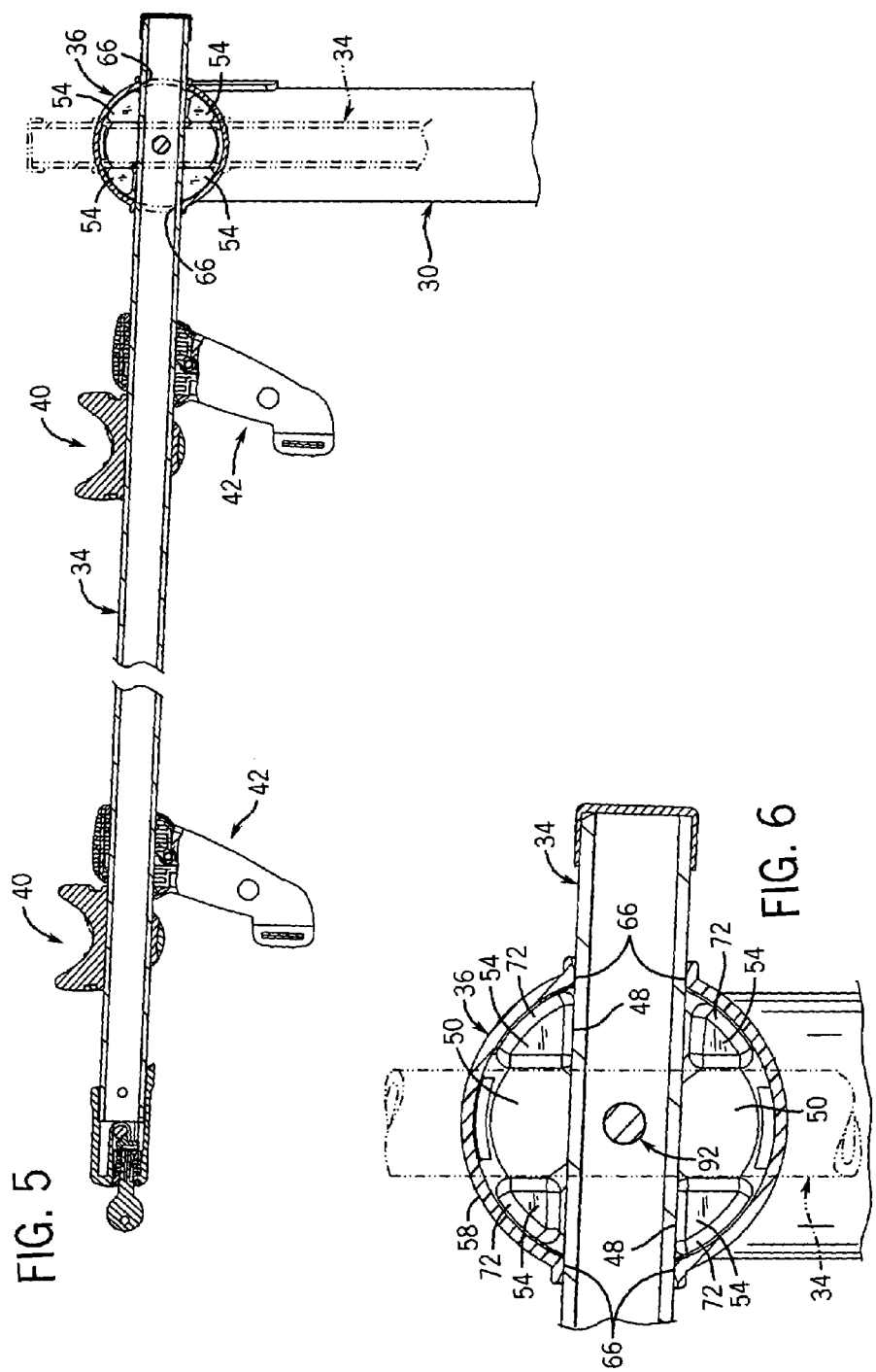

QUICK CONVERSION CONNECTION SYSTEM FOR A COMPONENT OF A VEHICLE-MOUNTED EQUIPMENT CARRIER

BACKGROUND AND SUMMARY OF THE INVENTION

This invention relates to a vehicle-mounted equipment carrier, such as a bicycle rack, and more particularly to a system for providing quick and easy movement of a component of an equipment carrier between an operative position and an inoperative position.

A vehicle-mounted equipment carrier, such as a bicycle rack, typically includes a base that is mounted to the vehicle and a support component that is mounted to the base and is configured to support the item of equipment. The support component is typically in the form of a support member or arm that is movable between a raised, operative position for supporting the item of equipment, and a lowered, inoperative position for storage or when the carrier is mounted to the vehicle but not in use. In a common configuration, a support arm of the equipment carrier is pivotably mounted to a transverse member of the carrier, for movement between the raised, operative position and the lowered, inoperative position. An engagement member is interconnected with the support arm and the transverse member, and is movable between an engaged position and a release position. The engagement member interacts with the transverse member and the support member for maintaining the support member in either the operative position or in the inoperative position. Representatively, the engagement member may be in the form of a manually operable knob having a threaded shaft that is engaged with a threaded passage in the transverse member of the carrier. The threaded shaft extends through an opening in the support member, and defines the pivot axis about which the support member is movable between the raised, operative position and the lowered, inoperative position. The end of the transverse member includes positioning structure, such as channels or the like, which receive the support member and are configured to position the support member in either the operative position or the inoperative position. With this construction, the threaded shaft must be relatively long in order to provide sufficient extension to allow the support member to clear the positioning structure for moving the support member between the operative and inoperative positions, while maintaining engagement of the threaded shaft within the threaded passage in the transverse member. The user must repeatedly rotate the knob in order to back the knob away from the transverse member so as to provide sufficient clearance to enable movement of the support member, which is an inconvenient and time consuming operation.

It is an object of the present invention to provide an engagement system for a movable component of a vehicle-mounted equipment carrier, which enables the component to be quickly and easily moved between an operative position and an inoperative position, and then engaged in the desired position. It is a further object of the invention to provide such an engagement system which operates in a manner similar to the prior art, yet eliminates the need to make a large number of rotations of an engagement member so as to move the engagement member between an engaged position and a release position. It is a further object of the invention to provide such an engagement system which is easy to use and provides the ability to rapidly convert an equipment carrier from a storage configuration to a use configuration. A still further object of the invention is to provide such an engagement system which is relatively simple in its components and construction, yet which provides positive and secure engagement of the support member in either the operative or inoperative position.

In accordance with one aspect of the present invention, a vehicle-mounted equipment carrier includes a base to which a support member of the carrier is mounted for movement between an operative position and an inoperative position. The carrier further includes an engagement member that is movable between a release position for providing movement of the support member between the operative and inoperative positions, and an engaged position for engaging the support member with the base so as to maintain the support member in either the operative position or the inoperative position.

The base preferably includes positioning structure with which the support member is engaged, and which is operable to place the support member in either the operative position or the inoperative position. In one form, the positioning structure comprises channel structure on an end defined by a transverse member forming a part of the base.

The engagement member is manually movable between the engaged and release positions by a combination engagement arrangement which provides movement of the engagement member between the engaged position and an intermediate position via a threaded connection that causes movement of the engagement member upon rotation of the engagement member, and which provides movement of the engagement member between the intermediate position and the release position via a sliding connection arrangement by which the engagement member is moved by application of an axial force to the engagement member. The engagement member includes a manually operable knob having an axial member, which may be in the form of a shaft, secured to and extending from the knob. The transverse member of the base includes a threaded opening, and the shaft of the engagement member extends through the support member into the opening in the transverse member. The shaft of the engagement member includes a threaded section which engages the threads provided at the opening so as to provide threaded movement of the knob toward and away from the transverse member between the engaged position and the intermediate position upon rotation of the knob. The shaft of the engagement member further includes an unthreaded section located outwardly of the threaded section, and the transition between the unthreaded section and the threaded section of the shaft defines the location of the intermediate position during movement of the engagement member toward and away from the positioning structure of the transverse member. The shaft of the engagement member also includes an end section that engages the transverse member when the engagement member attains a predetermined axial outward position, beyond the release position, relative to the transverse member upon axial outward movement of the engagement member. The end section of the engagement member shaft contacts the transverse member when the engagement member reaches the predetermined axial outward position, to act as a stop and to maintain the connection of the engagement member with the transverse member. The end section of the shaft may include threads that engage the threaded opening in the transverse member, to enable the shaft of the engagement member to be easily engaged with and disengaged from the transverse member by rotation of the engagement member relative to the transverse member.

The invention contemplates an equipment carrier having a movable support member that is secured in operative and inoperative positions via operation of an engagement member, as summarized above, as well as an improvement in an equipment carrier and a method of selectively maintaining a movable component of an equipment carrier in either an operative position or an inoperative position, also substantially in accordance with the foregoing summary.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 5 is a partial section view taken along line 5—5 of FIG. 2;

FIG. 6 is a partial section view taken along line 6—6 of FIG. 4;

DETAILED DESCRIPTION OF THE INVENTION

Figure 1:
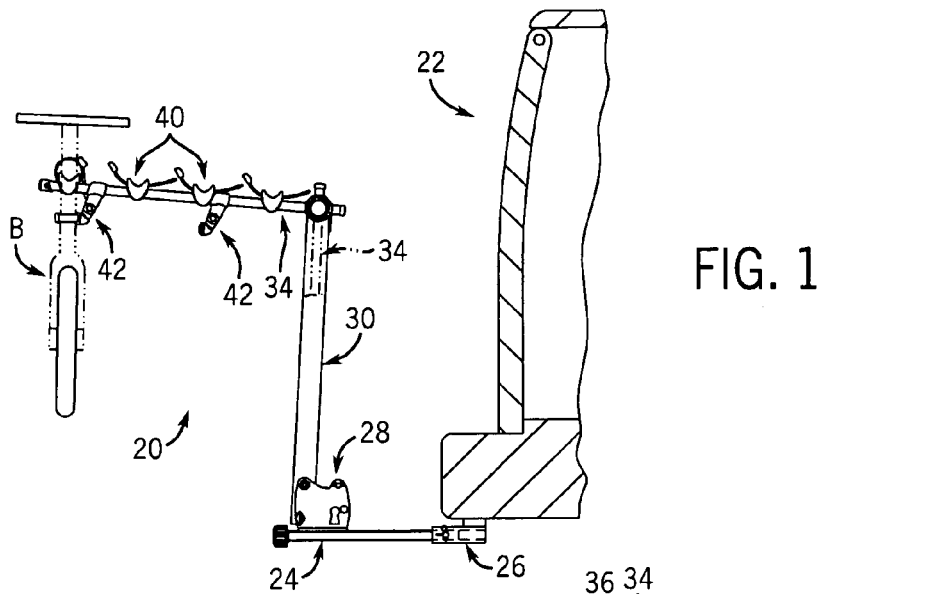
FIG. 1 is a side elevation view illustrating a vehicle-mounted equipment carrier, in the form of a bicycle carrier, which incorporates the quick conversion connection system of the present invention for moving a support member of the carrier between an operative position and an inoperative position.

FIG. 1 illustrates an equipment carrier, in the form of a bicycle rack 20, secured to a vehicle 22 for supporting equipment, such as one or more bicycles B, on vehicle 22. Bicycle rack 20 is secured to vehicle 22 by engagement of a mounting member 24, which forms a part of bicycle rack 20, within a passage defined by a hitch receiver 26 that is mounted to vehicle 22 in a conventional manner. The connection of mounting member 24 to hitch receiver 26 is detailed in copending application Ser. No. 10/679,739 filed Oct. 06, 2003, the disclosure of which is hereby incorporated by reference.

Figure 2:
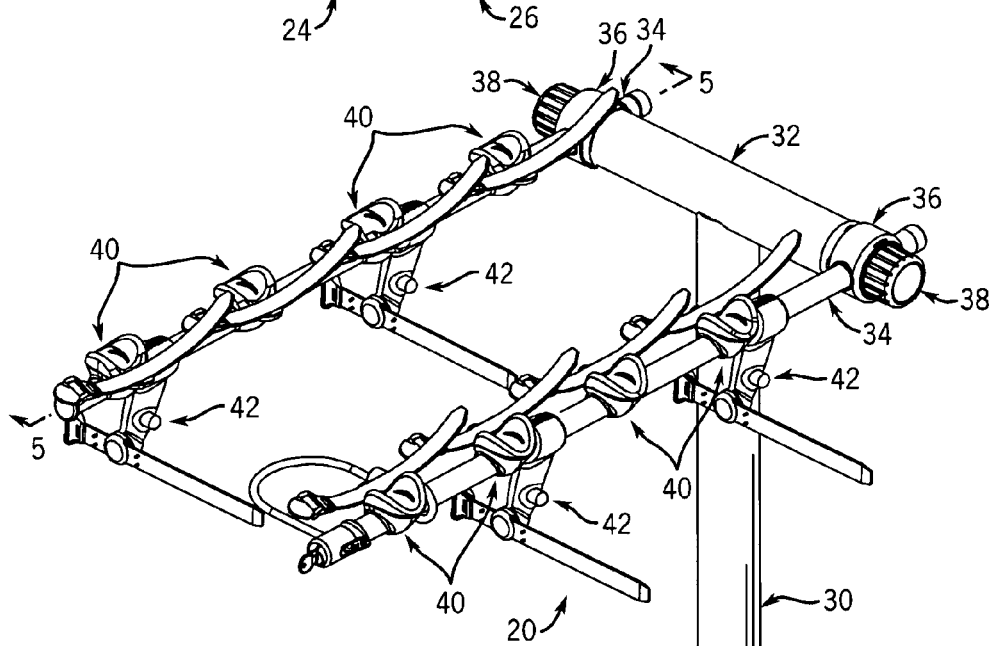
FIG. 2 is an isometric view of the carrier of FIG. 1, showing the support arms of the carrier in an operative position for use in supporting an item of equipment such as a bicycle.

In the illustrated embodiment, bicycle rack 20 includes a mounting bracket 28 secured to mounting member 24, and an upwardly extending vertical support member 30 is connected at its lower end to mounting bracket 28. A transversely extending upper member 32 (FIG. 2) is secured to the upper end of vertical support member 30, and a pair of support arms 34 extend rearwardly from the ends of transverse upper member 32. Each support arm 34 is pivotably interconnected at its inner end with the outer end of transverse upper member 32 via a hub member 36 and an engagement member 38. In a manner to be explained, the ends of transverse upper member 32 cooperate with hubs 36 and engagement members 38 for selectively maintaining support arms 34 in either a raised, rearwardly extending operative position as shown in FIG. 2, or a lowered, downwardly extending inoperative position in which support arms 34 are oriented generally parallel to vertical support member 30.

Each support arm 34 has a series of cradles or hold-downs 40, engaged along its length. The construction of hold-downs 40 is detailed in copending application Ser. No. 10/682,717 filed Oct. 09, 2003, the disclosure of which is hereby incorporated by reference. Hold-downs 40 are configured to receive and engage a component of bicycle B, such as the bicycle top tube or any other satisfactory component, for maintaining bicycle B in engagement with support arm 34 at a desired location along the length of support arm 34. With this construction, the top tube of bicycle B extends across the space between support arms 34 for engagement with a pair of aligned hold-downs 40, each of which is carried by one of support arms 34. Bicycle B is thus supported from support arms 34 in a suspension-type manner.

In order to prevent swinging movement of bicycle B when bicycle B is supported on support arms 34, a series of stabilizing members 42 are secured to support arms 34. Representatively, a stabilizing member 42 is located adjacent one of the hold-downs 40 that engages top tube T of bicycle B. The construction and operation of stabilizing members 40 is set forth in copending application Ser. No. 10/682,471 filed Oct. 09, 2003, the disclosure of which is hereby incorporated by reference.

Figure 3:
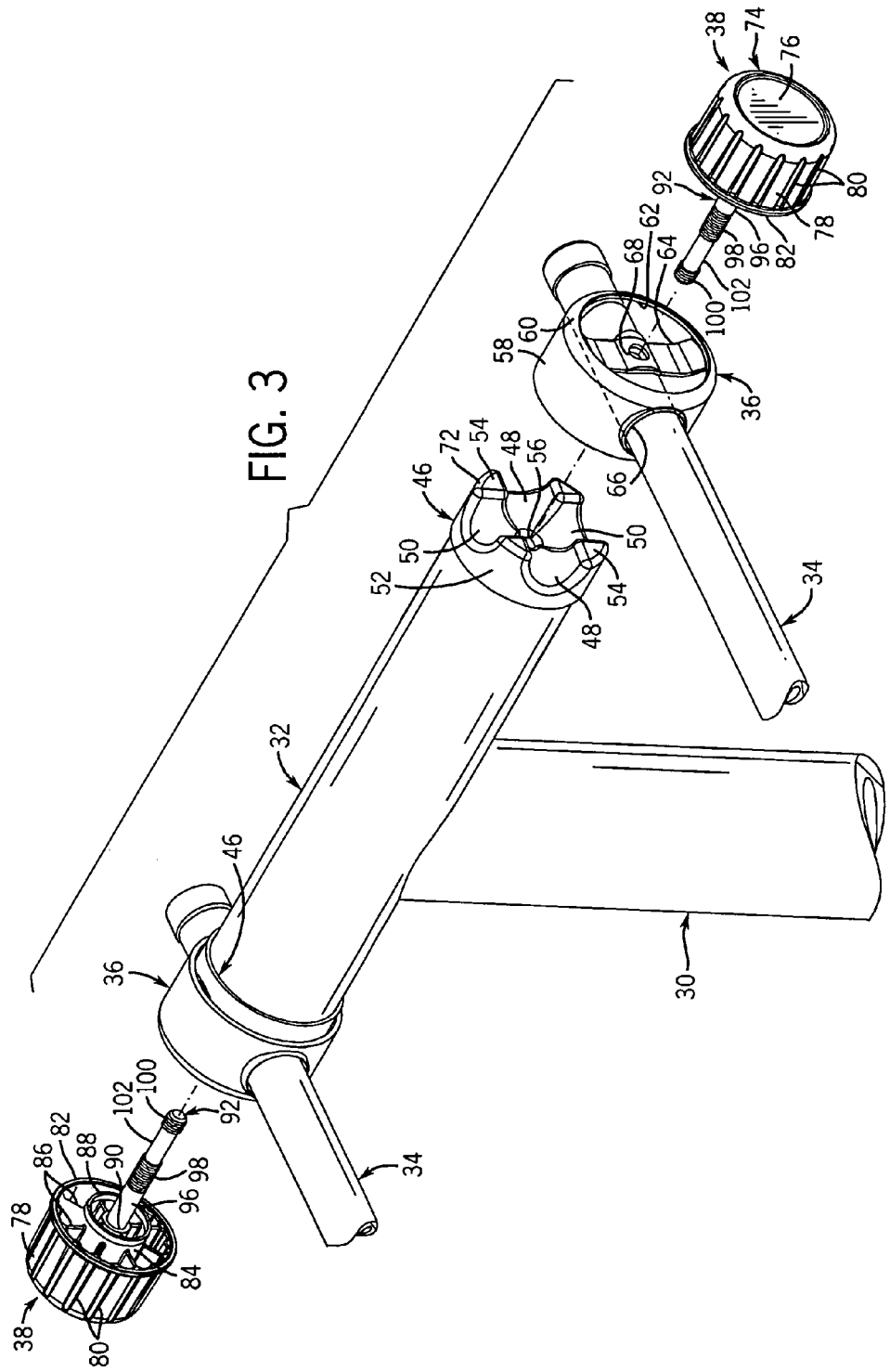
FIG. 3 is a partial exploded isometric view showing an upper portion of the base of the carrier of FIG. 1 and the connection of the support members to the ends of the transverse member forming part of the base, and illustrating the quick conversion system of the present invention for moving the support members between an operative position and an inoperative position.

FIG. 3 illustrates the manner in which each support arm 34 is engaged with an end of transverse member 32. An end cap 46 is mounted to each end of transverse member 32. The outwardly facing area of end cap 46 defines aligned horizontal channel sections 48 and aligned vertical channel sections 50. Channel sections 48, 50 define recesses in the side wall of end cap 48, shown at 52, and the outer end of end cap 46 forms a series of lands 54 located between channel sections 48, 50. End cap 46 further includes an outwardly facing, central threaded passage 56 that is located between and at the intersection of horizontal channel sections 48 and vertical channel sections 50.

Hub 36 is a cover member in the form of a ring, including a side wall 58 that spans the interface between end cap 46 and engagement member 38. Hub 36 further includes an inwardly angled partial end wall 60 at the outer end of side wall 58, and defines an opening 62. A bracket 64 extends across opening 62, and is secured at its ends to opposite areas of end wall 60. Bracket 64 includes an arcuate central area that engages the side of support arm 34.

Side wall 58 is formed with a pair of aligned openings 66, and support arm 34 extends through openings 66. Bracket 64 includes a central opening 68, and support arm 34 is positioned relative to hub 36 such that openings 70 (FIG. 8) in the side wall of support member 34 are placed in alignment with bracket opening 68. Hub 36 is sized such that the inside diameter of ring side wall 58 is slightly larger than the outside diameter of end cap side wall 52, so that side wall 58 fits over end cap 52. Angled end wall 60 is configured for engaging beveled outer surfaces, shown at 72, of each land 54.

Figure 4:
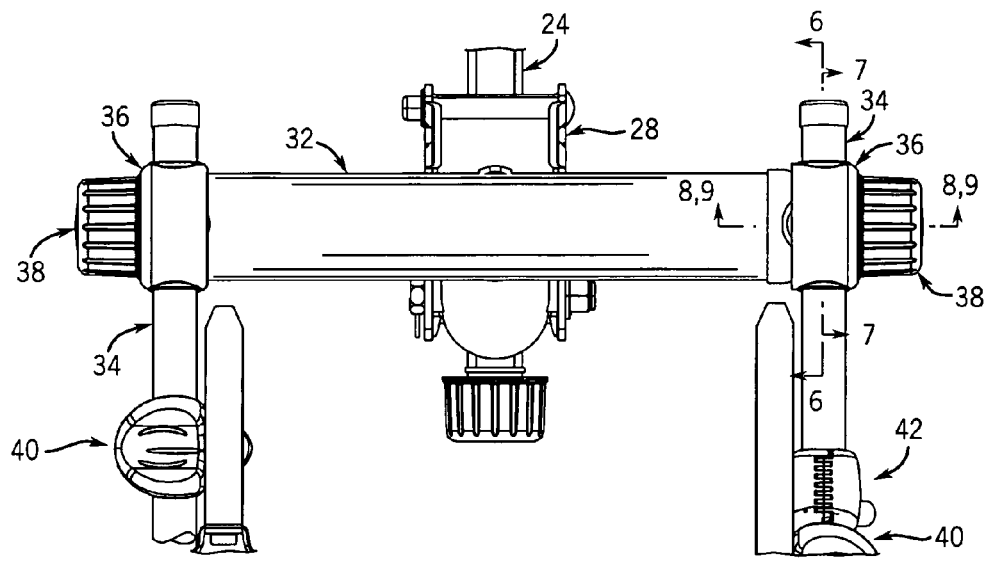
FIG. 4 is a partial top plan view showing the assembled components of the carrier as illustrated in FIG. 3, in which the rightward engagement member is shown in a disengaged position to enable movement of the support arm between the operative and inoperative positions.
Figure 7:
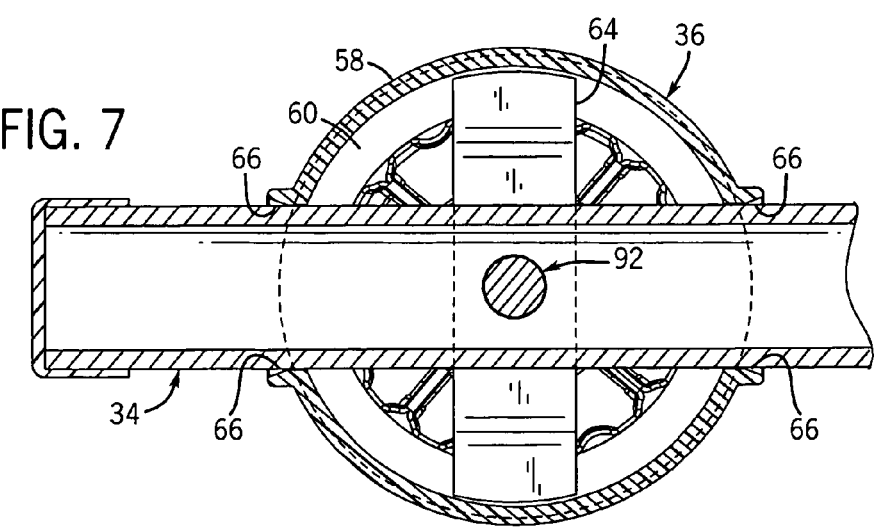
FIG. 7 is a partial section view taken along line 7—7 of FIG. 4.

Engagement member 38 is movable between a series of positions relative to transverse member 32 for selectively maintaining support arm 34 in either the raised, operative position as shown in FIGS. 3, 4 and as shown in solid in FIG. 5, and an inoperative position as shown in phantom in FIG. 5. In the illustrated embodiment, engagement member 38 is in the form of a knob 74 having an outer wall 76 and a side wall 78 having a series of circumferentially spaced ridges 80 and terminating in an inner end edge 82. As shown in FIG. 3, knob 38 includes a cylindrical hub 84 within the interior defined by side wall 78, and which is interconnected with side wall 78 via a series of radial webs 86. Hub 84 defines an inwardly facing engagement rim 88, and a cylindrical shaft receiver 90 is located inwardly of engagement rim 88.

Engagement member 38 further includes a shaft 92 that extends from knob 74. Shaft 92 defines an outer end that is nonrotatably engaged within the passage defined by shaft receiver 90 of knob 74, such as by means of a series of knurls 94 (FIG. 8) that are formed on the outer end portion of shaft 92 and are engaged in the inner surface of the passage defined by shaft receiver 90. It is understood, however, that any other satisfactory connection arrangement may be employed for securing knob 74 and shaft 92 together, e.g. molding the plastic of knob 74 over a non-circular head formed on the inner end of shaft 92. Shaft 92 further includes an unthreaded section 96 located outwardly of the end of shaft receiver 90, and a threaded section 98 located outwardly of unthreaded section 96. In addition, shaft 92 includes a threaded outer end section 100, and an unthreaded section 102 located between threaded section 98 and outer end section 100. Threaded section 98 and outer end section 100 have the same nominal diameter, and each is configured for threaded engagement with the threads of passage 56 in end cap 46. Unthreaded section 102 has a smaller diameter than threaded section 98 and outer end section 100, which is therefore less than the diameter of passage 56. Threads 94 on the outer end of shaft 92, which are engaged within shaft receiver 90, have a pitch opposite that of threaded section 98 and the threads of outer end section 100.

Figure 8:
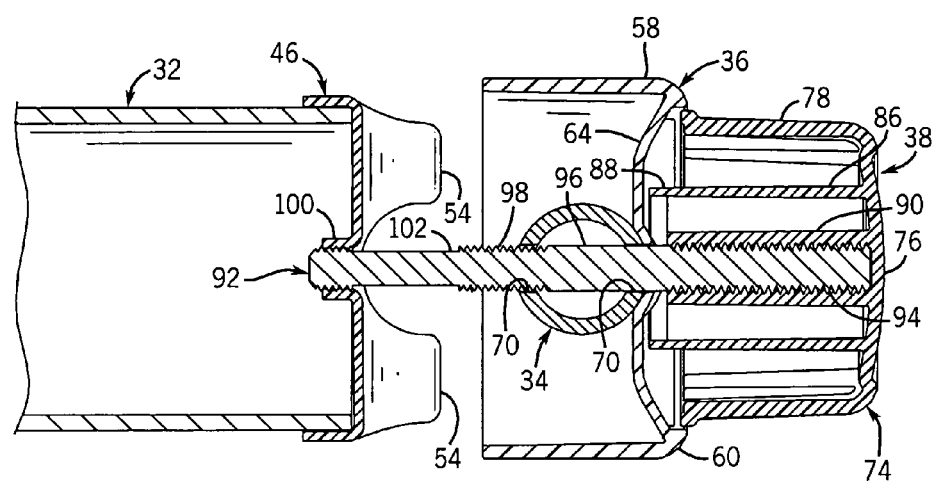
FIG. 8 is a partial section view taken along line 8—8 of FIG. 4, showing an engagement member of the quick conversion system of the present invention in an outermost position and showing the support member of the carrier in the operative position.
Figure 9:
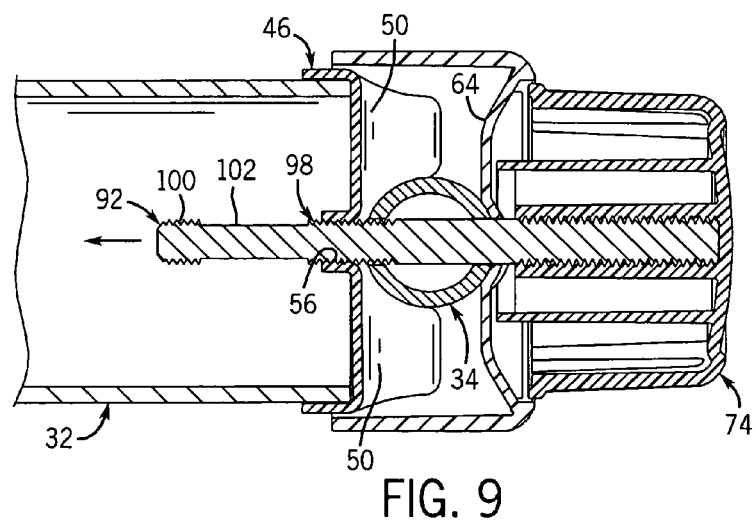
FIG. 9 is a partial section view similar to FIG. 8 and taken along line 9—9 of FIG. 4, showing the engagement member in an engaged position and the support member in the operative position.

In operation, support arm 34 is selectively engaged in either the operative position or the inoperative position as follows. As shown in FIG. 3, support arm 34 is placed in the operative position by orienting support arm 34 and hub 36 so that the length of support arm 34 contained within hub 36 is in alignment with horizontal channel sections 48. Hub 36 is then advanced over end cap 46 so that support arm 34 is received within channel sections 48 and side wall 58 of hub 36 overlies side wall 52 of end cap 46, as shown in FIG. 9. Shaft 92 is inserted through opening 68 in bracket 64 and through aligned openings 70 (FIG. 8) in the walls of support arm 34, and advanced toward passage 56 of end cap 46. Threaded end section 100 of shaft 92 is then engaged with the threads of passage 56, as shown in FIG. 8, by rotation of shaft 92 through rotation of knob 74. The user continues to rotate knob 74 so as to advance end section 100 relative to threaded passage 76, and the threads of end section 100 then are advanced inwardly into the interior of transverse member 32 out of engagement with the inner extent of the threads of passage 56, which functions to position unthreaded section 102 of shaft 92 within passage 56. When shaft 92 has attained this position, the user applies an axial inward force to knob 74, which functions to provide rapid axial inward movement of shaft 92 within passage 56 to thereby advance knob 74 toward end cap 46. During such inward movement of knob 74, the inner extent of knob 74, as defined by engagement rim 88, is positioned relative to hub bracket 64 such that bracket 64 maintains support arm 34 within horizontal channel sections 48 of end cap 46. Upon continued advancement of engagement member 74 by application of the axial inward force to knob 74, the outer end of threaded section 98 is moved into engagement with the threads of passage 56, which places engagement member 38 in an intermediate position in which knob 74 is spaced outwardly from end cap 46. When engagement member 38 attains the intermediate position, the user then resumes rotation of knob 74, which continues to advance knob 74 inwardly from the intermediate position toward end cap 46, as shown in FIG. 9, by virtue of the threaded engagement of threaded section 98 with the threads of passage 56. The user continues such rotation of knob 74, which eventually results in engagement rim 88 coming into contact with the area of support arm 34 located between engagement member 38 and end cap 46. As the user continues rotation of knob 74, engagement member 38 is placed in the engaged position in which engagement rim 88 is tightened onto support arm 34, which functions to clamp support arm 34 against the surfaces of horizontal channel sections 48 to maintain support arm 34 in the outwardly extending, operative position.

Figure 10:
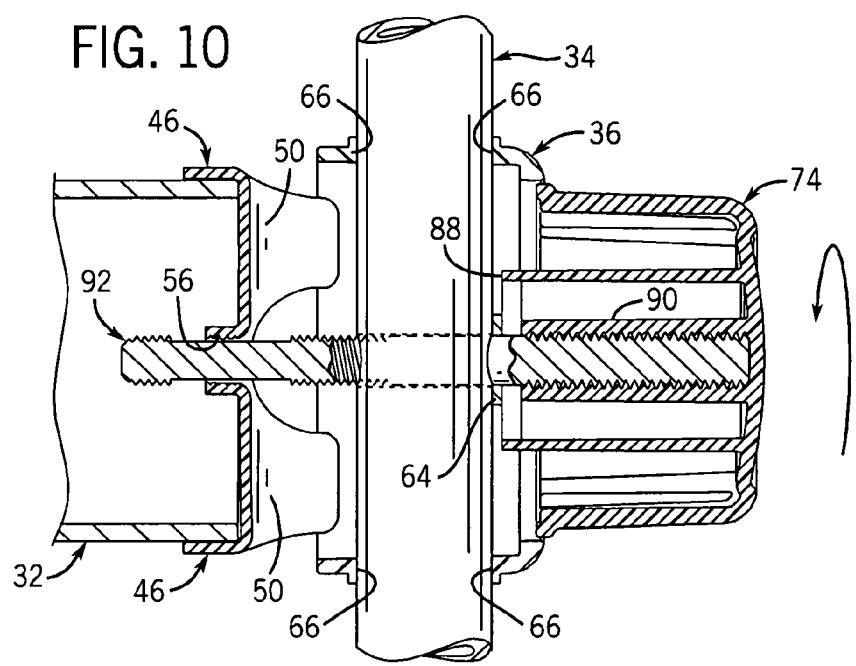
FIG. 10 is a view similar to FIGS. 8 and 9, showing the engagement member in a release position and movement of the support member to an inoperative position.
Figure 11:
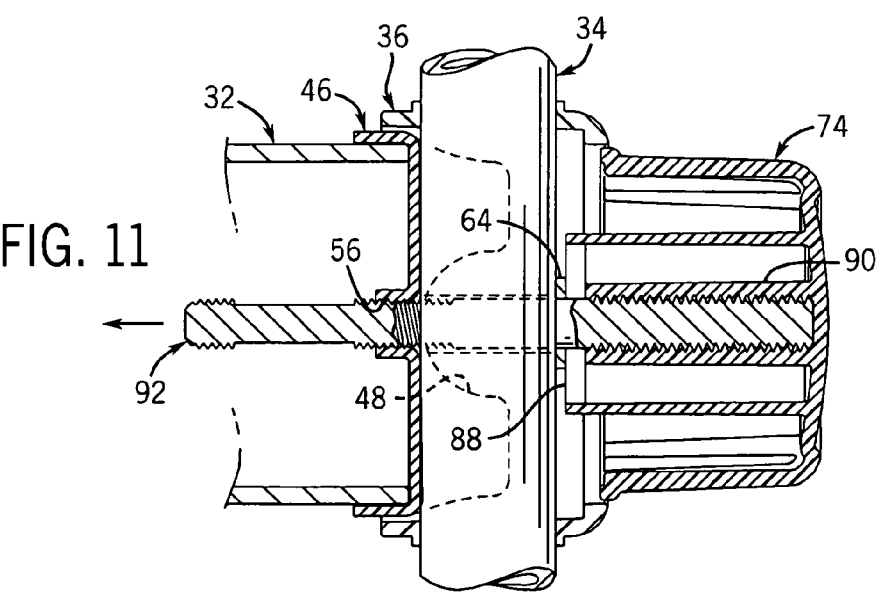
FIG. 11 is a view similar to FIG. 10, showing the support member in the inoperative position and the engagement member in the engaged position.

When it is desired to convert carrier 20 from the operative configuration, in which support arms 34 are in the raised, operative position, to an inoperative configuration in which support arms 34 are in the lowered, inoperative position, the user reverses the above steps so as to move engagement rim 88 outwardly from the engaged position relative to bracket 64 by rotation of knob 74, to release the clamping force applied to support arm 34 that maintains support arm 34 in engagement within horizontal channel sections 48. Continued reverse rotation of knob 74 results in outward movement of shaft 92 relative to passage 56, and eventually results in engagement member reaching the intermediate position in which threaded section 98 is disengaged from the threads of passage 56. When shaft 92 is in the intermediate position, knob 74 is positioned such that support arm 34 is maintained within horizontal channel sections 48. Once engagement member 38 is in the intermediate position described above, unthreaded section 102 is positioned within passage 56 and the user then applies an axial outward force to knob 74 so as to cause rapid movement of knob 74 outwardly relative to end cap 46 to a release position as shown in FIG. 10, in which knob 74 provides sufficient clearance from end cap 46 so as to allow support arm 34 to be disengaged from horizontal channel sections 48. The user then rotates support arm 34 about a pivot axis defined by the longitudinal axis of shaft 92, so as to align support arm 34 with vertical channel sections 50 in end cap 46. When the axial outward force is applied to knob 74 so as to rapidly advance shaft 92 outwardly relative to end cap 46, outer end section 100 provides a stop that prevents outward movement of shaft 92 beyond a predetermined position relative to end cap 46. In this manner, shaft 92 is maintained in engagement with end cap 56 while support member 34 is pivoted about shaft 92 between the operative and inoperative positions. If it is desired to fully disengage engagement member 38, the user resumes rotation of knob 74 so as to advance the threads of outer end section 100 outwardly within the threads of passage 56. Otherwise, the threads of outer end section 100 simply stop outward advancement of shaft 92 by axial movement of shaft 92 within passage 56, to enable the user to change the position of support member 34 from the raised, operative position in alignment with channel sections 48 to the lowered, inoperative position in alignment with channel sections 50. When support arm 34 is placed into alignment with vertical channel sections 50 in this manner, the user then applies an axial inward force to knob 74 to rapidly advances shaft 92 inwardly to the intermediate position, in which threaded section 98 comes into contact with the threads of passage 56. The user then rotates knob 74 to advance knob 74 toward bracket 64 by the threaded engagement of threaded section 98 with the threads of end cap passage 56, as shown in FIG. 11, to apply a clamping force on bracket 64 that forces support arm 34 against the surfaces of vertical channel sections 50, to securely maintain support arm 34 in the inoperative position.

It can thus be appreciated with the construction of engagement member 38 provides a system by which carrier 20 can be quickly and easily converted from an operative configuration to an inoperative configuration by movement of support arms 34 between the operative and inoperative positions. The unthreaded section of shaft 92 located between threaded section 98 and outer end section 100 provides axial slip-type movement of shaft 92 relative to passage 56, which eliminates the need to make the numerous rotations of knob 74 that would otherwise be required to move knob 74 between the engaged and release positions as described.

While the invention has been shown and described with respect to a specific embodiment, it is understood that various alternatives and modifications are possible and are contemplated as being within the scope of the present invention. For example, and without limitation, the invention has been shown and described with shaft 92 being secured to knob 74 and engaged within a threaded opening in end cap 46. It is also contemplated that the shaft may be fixed at its inner end to the end cap or other structure associated with the base of the carrier so as to extend outwardly therefrom, though openings or the like formed in the support arm. In this construction, the shaft has spaced apart threaded sections, and knob 74 is provided with an internally threaded section that is engageable with the spaced apart threaded sections of the shaft to provide rapid advancement of the knob by application of an axial force to the knob when the threads of the knob are between the threaded sections of the shaft. In addition, in an arrangement of this type, the shaft may have a single threaded section and an unthreaded engagement of the threaded section of the knob with a portion of the shaft outward of the threaded section, to move the shaft axially inwardly into engagement with the threaded section. In addition, while end section 100 of shaft 92 is shown and described as being threaded, it is also understood that the end of shaft 92 may be unthreaded and have a transverse dimension larger than that of passage 56, to provide a stop against axial outward movement of shaft 92 and to prevent disengagement of shaft 92 from end cap 46. It is also contemplated that the end section of the shaft may have any other structure that prevents outward movement relative to the end cap when the shaft attains a predetermined outward position. The disclosed embodiment, namely threads on the end section, provides the dual function of stopping outward movement of the shaft at a predetermined position as well as providing easy, tool-less assembly. Further, while the quick conversion system of the present invention has been shown and described with respect to a hitch-mounted bicycle carrier, it is understood that the quick conversion system of the present invention may be used in any type of vehicle-mounted carrier, such as a trunk mounted carrier, having a component that is movable between an operative position and an inoperative position. Further, while the support arm of the carrier is shown as being in an operative position when raised and inoperative position when lowered, it is understood that the support arm may be movable between other operative and inoperative positions. In addition, the specific engagement structure involving hub 36, bracket 64 and the channel structure of end cap 46 may vary from that shown and described, so long as the positioning and engagement structure is configured to provide positive engagement of the support member when in the various positions upon advancement of the engagement member toward and the support member.

Various alternatives and embodiments are contemplated as being within the scope of the following claims particularly pointing out and distinctly claiming the subject matter regarded as the invention.

I claim:

1. An equipment carrier for mounting to a vehicle, comprising:
    a base configured for connection to the vehicle;
    a support member mounted to base for movement between an operative position and an inoperative position; and
    an engagement member interconnected with the base, wherein the engagement member is operable to selectively maintain the support member in either the operative position or the inoperative position, wherein the engagement member is movable between an engaged position in which the engagement member engages the support member to maintain the support member in one of the operative and inoperative positions, and a release position in which the engagement member is disengaged from the support member to enable movement of the support member between the operative and inoperative positions;
    wherein the engagement member is movable inwardly toward the base to the engaged position via a threaded connection between the engagement member and the base that provides movement of the engagement member toward the base upon rotation of the engagement member in a first direction of rotation, wherein the threaded connection further provides movement of the engagement member away from the engaged position to an intermediate position upon rotation of the engagement member in a second direction of rotation opposite the first direction of rotation, and wherein the engagement member is interconnected with the base so as to be movable from the intermediate position to the release position via axial outward movement of the engagement member relative to the base without threaded engagement between the engagement member and the base.

2. The equipment carrier of claim 1, wherein the engagement member comprises a knob and a shaft extending from the knob, wherein the threaded connection between the engagement member and the base comprises a threaded section on the shaft that is engaged with a threaded opening in the base, and wherein the shaft includes an unthreaded section located outwardly of the threaded section that is received within the opening and that provides axial movement of the engagement member relative to the base.

3. The equipment carrier of claim 2, wherein the shaft includes an outer retainer section that engages the opening in the base outwardly of the unthreaded section to maintain the engagement member in engagement with the base.

4. The equipment carrier of claim 3, wherein the retainer section is sized so as to engage a surface associated with the base that defines the opening so as to prevent the threaded member from being disengaged from the base upon axial outward movement of the engagement member relative to the base.

5. The equipment carrier of claim 4, wherein the retainer section comprises an end portion of the shaft that includes threads which mate with the threaded opening in the base such that rotation of the engagement member relative to the base causes the shaft to be moved into the opening so as to advance the unthreaded section of the shaft into the opening, or causes the shaft to the moved out of the opening to disengage the shaft from the base.

6. The equipment carrier of claim 2, wherein the base comprises a transverse member having an end to which the support member is mounted, and wherein the end of the transverse member includes positioning structure for positioning the support member in either the operative position or the inoperative position, and wherein the engagement member in the release position enables the support member to move on the shaft outwardly past the positioning structure to enable movement of the support member between the operative and inoperative positions, and wherein the engagement in the intermediate position maintains the support member in engagement with the positioning structure in engagement with the positioning structure to prevent movement of the support member between the operative and inoperative positions.

7. The equipment carrier of claim 6, wherein the positioning structure includes intersecting channels on the end of the transverse member that are configured to receive the support member to maintain the support member in either the operative position or the inoperative position, and wherein the channels are separated by outwardly extending wall structure, wherein the engagement member in the release position maintains the support member in engagement with the wall structure and in the release position provides sufficient outward movement of the support member to clear the wall structure to provide movement of the support member between the operative and inoperative positions.

8. A method of converting a vehicle-mounted equipment carrier from an operative configuration to an inoperative configuration, wherein the equipment carrier comprises a vehicle-mounted base section and a support member movably mounted to the base section for movement between an operative position and an inoperative position, wherein the support member is maintained in engagement with the base section via an engagement member that is movably interconnected with the base section for movement between an engaged position in which the engagement member maintains the support member in either the operative position or the inoperative position, comprising the steps of moving the engagement member between the engaged position and an intermediate position by rotation of the engagement member and a threaded connection between the engagement member and the base section, and moving the engagement member between the intermediate position and a release position by axial movement of the engagement member and a sliding connection between the engagement member and the base section.

9. The method of claim 8, wherein the engagement member includes an outer knob section and a shaft extending from the outer knob section, wherein the shaft is received within a threaded opening in the base section, and wherein the steps of rotating the engagement member and axially moving the engagement member are carried out by manual engagement with the knob section so as to selectively rotate the shaft within the threaded opening or to move the shaft axially within the threaded opening.

10. The method of claim 9, wherein the shaft includes a threaded section configured for threaded engagement within the threaded opening of the base section, and further includes an unthreaded section located adjacent the threaded section and configured to be received within the opening of the base section without threaded engagement of the shaft with the threaded opening, wherein the step of rotating the engagement member to rotate the shaft is carried out when the threaded section of the shaft is engaged within the opening of the base section to provide threaded movement of the knob section relative to the support member, and wherein the step of axially moving the engagement member to move the shaft axially within the threaded opening is carried out when the unthreaded section of the shaft is located within the opening of the base section.

11. The method of claim 10, wherein the base section includes positioning structure that engages the support member to maintain the support member in either the operative position or the inoperative position, wherein the step of moving the engagement member to the release position disengages the support member from the positioning structure to enable the support member to be moved between the operative position and the inoperative position.

12. The method of claim 11, wherein the step of moving the engagement member to the intermediate position is operable to move the engagement member away from the support member, and wherein the engagement member in the intermediate position maintains engagement of the support member with the positioning structure and prevents movement of the support member between the operative and inoperative positions.

13. The method of claim 10, further comprising the step of preventing axial outward movement of the engagement member relative to the base section when the engagement member attains a predetermined outward position relative to the base section.

14. The method of claim 13, wherein the step of preventing outward movement of the engagement member is carried out by means of an outer end section on the shaft that engages the threaded opening of the base section when the shaft is moved outwardly within the opening to the predetermined position so as to prevent further axial outward movement of the shaft within the threaded opening.

15. The method of claim 14, wherein the outer end section of the shaft includes threads that are configured to engage the threads of the opening of the base section, and further comprising the step of rotating the knob section when the threads of the end section are engaged within the threaded opening of the base section to move the unthreaded section of the shaft toward and away from the threaded opening of the base section.

16. An equipment carrier for mounting to a vehicle, comprising:

a base configured for connection to the vehicle;

a support member mounted to base for movement between an operative position and an inoperative position; and an engagement member interconnected with the base, wherein the engagement member is operable to selectively maintain the support member in either the operative position or the inoperative position, wherein the engagement member is movable between an engaged position in which the engagement member engages the support member to maintain the support member in one of the operative and inoperative positions, and a release position in which the engagement member is disengaged from the support member to enable movement of the support member between the operative and inoperative positions;

wherein the engagement member is movable between the engaged and release positions by a combination engagement arrangement between the engagement member and the base that provides partial movement of the engagement member between the engaged position and the release position via rotation of the engagement member and a threaded connection between the engagement member and the base, and which provides partial movement between the engaged position and the release position via axial movement of the engagement member and a sliding connection between the engagement member and the base.

17. The equipment carrier of claim 16, wherein the engagement member includes a shaft and wherein the threaded connection between the engagement member and the base comprises a threaded section on the shaft that is engaged with a threaded opening in the base, and wherein the sliding connection between the engagement member and the base comprises an unthreaded section on the shaft that is received within the threaded opening in the base.

18. The equipment carrier of claim 17, wherein the threaded section on the shaft is positioned so as to provide movement of the engagement member toward and away from the engaged position to an intermediate position, and wherein the unthreaded section on the shaft is positioned so as to provide movement of the engagement member toward and away from the intermediate position and the release position.

19. The equipment carrier of claim 18, wherein the base includes positioning structure that interacts with the support member to place the support member in wither the operative position or the inoperative position, and wherein the engagement member in the release position provides clearance between the positioning structure and the support member that enables movement of the support member between the operative and inoperative positions, and wherein the engagement member in the intermediate position maintains the support member in engagement with the positioning structure to prevent movement of the support member between the operative and inoperative positions.

20. The equipment carrier of claim 19, wherein the shaft further includes an end section located adjacent the unthreaded section, wherein the end section is configured to prevent axial outward movement of the shaft relative to the base when the engagement member is moved to a predetermined position outwardly of the release position relative to the base.

21. The equipment carrier of claim 20, wherein the end section of the shaft includes threads that are configured to engage the opening in the base to as to enable the engagement member to be disengaged from the base upon rotation of the engagement member relative to the base.

\* \* \* \* \*

UNITED STATES PATENT AND TRADEMARK OFFICE
CERTIFICATE OF CORRECTION

| | | |
|---|---|---|
| PATENT NO. | : 7,055,725 B1 | Page 1 of 1 |
| APPLICATION NO. | : 10/682716 | |
| DATED | : June 6, 2006 | |
| INVENTOR(S) | : Clint D. Kolda | |

It is certified that error appears in the above-identified patent and that said Letters Patent is hereby corrected as shown below:

<u>IN THE CLAIMS</u>

CLAIM 5, column 9, line 19, delete "the" ($2^{nd}$ occurrence) and substitute therefore -- be --;

CLAIM 19, column 12, line 11, delete "wither" and subtitute therefore -- either --;

CLAIM 21, column 12, line 30, delete "to" ($1^{st}$ occurrence) and substitute therefore -- so --.

Signed and Sealed this

Fifth Day of September, 2006

JON W. DUDAS
*Director of the United States Patent and Trademark Office*